(12) United States Patent
Phan et al.

(10) Patent No.: US 11,761,216 B2
(45) Date of Patent: *Sep. 19, 2023

(54) FOLDING GUARDRAIL

(71) Applicant: The Boeing Company, Chicago, IL (US)

(72) Inventors: Tuan-Vu T. Phan, Kent, WA (US); Tyler J. Shelton, Kent, WA (US); Scott L. Rost, Graham, WA (US)

(73) Assignee: The Boeing Company, Arlington, VA (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/328,725

(22) Filed: May 24, 2021

(65) Prior Publication Data

US 2021/0293029 A1 Sep. 23, 2021

Related U.S. Application Data

(62) Division of application No. 16/129,823, filed on Sep. 13, 2018, now Pat. No. 11,035,135.

(51) Int. Cl.
| | |
|---|---|
| *E04G 5/14* | (2006.01) |
| *E04F 11/18* | (2006.01) |
| *G07C 3/00* | (2006.01) |
| *E04G 21/32* | (2006.01) |
| *B64F 1/22* | (2006.01) |

(52) U.S. Cl.
CPC .......... *E04G 5/142* (2013.01); *E04F 11/1865* (2013.01); *G07C 3/00* (2013.01); *B64F 1/222* (2013.01); *E04F 2011/1876* (2013.01); *E04G 21/3228* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,178,364 | B1 * | 1/2001 | Delurey | B60R 3/02 |
| | | | | 280/166 |
| 9,745,762 | B2 | 8/2017 | Moran | |
| 2015/0176286 | A1 | 6/2015 | Suggate | |
| 2017/0096824 | A1 * | 4/2017 | Melic | E04G 21/3228 |
| 2018/0135307 | A1 * | 5/2018 | Moran | E04G 21/3228 |
| 2018/0266127 | A1 * | 9/2018 | Smith | E04G 21/3228 |

FOREIGN PATENT DOCUMENTS

| | | |
|---|---|---|
| FR | 2661932 | 11/1991 |
| FR | 2661932 A1 * | 11/1995 |

\* cited by examiner

*Primary Examiner* — Kyle Armstrong
(74) *Attorney, Agent, or Firm* — McDonnell Boehnen Hulbert & Berghoff LLP

(57) ABSTRACT

The present disclosure relates systems and methods involving movable/adjustable guardrails. An example system includes a frame weldment and a rail assembly attached to the frame weldment. The rail assembly includes a first post and a second post. The base portion of the first post is rotatably coupled to a first pivot point of the frame weldment and the base portion of the second post is rotatably coupled to a second pivot point of the frame weldment. The system also includes a top rail rotatably coupled between a top portion of the first post and a top portion of the second post. The system yet further includes an actuator configured to controllably adjust a configuration of the rail assembly between an extended configuration and a retracted configuration with respect to the frame weldment.

20 Claims, 10 Drawing Sheets

FOLDING GUARDRAIL

CROSS-REFERENCE TO RELATED APPLICATION

The present application is a divisional of U.S. patent application Ser. No. 16/129,823, filed Sep. 13, 2018, the content of which is herewith incorporated by reference.

FIELD

The present disclosure generally relates to systems and methods involving adjustable and/or movable guardrails.

BACKGROUND

During their manufacture in an airplane production facility, aircraft move along the production line between different stages of assembly. This periodic (e.g., daily) movement is called "pulsing" the production line.

In some stages of assembly, movable deck platforms may provide personnel access to elevated portions of the airplane. To avoid falls from the movable deck platform, such platforms may include various guardrails.

Currently, prior to pulsing the production line, some guardrails on the movable deck platforms need to be manually removed (e.g., by hand) so they do not impede the progress of airplanes as they move along the production line. Once a new airplane is in a proper position along the production line, the guardrails are manually reinstalled so as to protect personnel from various hazards.

Frequent handling of the removable guardrails sections, which can weigh 40 pounds, or more, can lead to repetitive lift injuries. Furthermore, personnel who install and remove the guardrails can be at particular risk of falling.

SUMMARY

In an aspect, a system is described. The system includes a frame weldment and a rail assembly. The rail assembly includes a first post and a second post. A base portion of the first post is rotatably coupled to a first pivot point of the frame weldment and a base portion of the second post is rotatably coupled to a second pivot point of the frame weldment. The system also includes a top rail rotatably coupled between a top portion of the first post and a top portion of the second post. The system yet further includes an actuator configured to controllably adjust a configuration of the rail assembly between an extended configuration and a retracted configuration with respect to the frame weldment.

In another aspect, a movable deck platform is described. The movable deck platform includes a walking surface and a frame weldment coupled at or below the walking surface. The movable deck platform also includes a rail assembly. The rail assembly includes a first post and a second post. A base portion of the first post is rotatably coupled to a first pivot point of the frame weldment and a base portion of the second post is rotatably coupled to a second pivot point of the frame weldment. The movable deck platform also includes a top rail rotatably coupled between a top portion of the first post and a top portion of the second post. Yet further, the movable deck platform includes an actuator configured to controllably adjust a configuration of the rail assembly between an extended configuration and a retracted configuration with respect to the walking surface.

In a further aspect, a method is described. The method includes receiving information indicative of a desired configuration or a desired movement of a rail assembly of a movable deck platform. The method also includes foldably adjusting the rail assembly according to the desired configuration or the desired movement.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Figure 1:
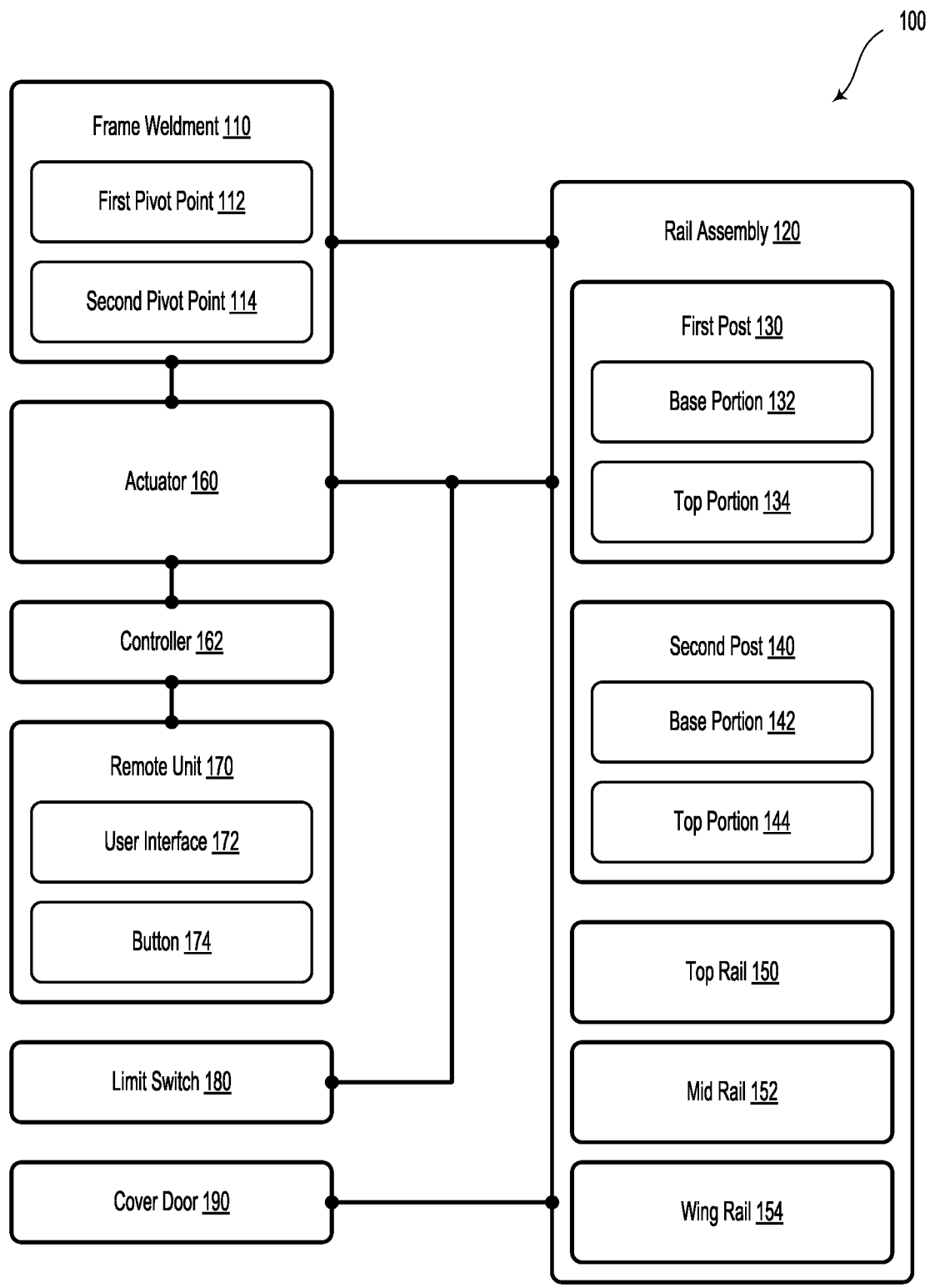
FIG. 1 illustrates a system, according to an example implementation.

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure relates to folding guardrails that can retract and extend in an automated fashion without exposing personnel to injury risks. The systems and methods for folding guardrails could be implemented on movable deck platforms or in other similar scenarios. In such examples, tooling personnel can retract and extend the guardrails before and after pulsing of the production line instead of manually lifting, carrying, and installing the guardrails onto the deck platforms.

In some embodiments, the folding guardrails can be extended and retracted using electric linear actuators that may be controlled with a hand remote. Furthermore, the folding guardrails could retract into an enclosed frame weldment at or below the deck surface. Additionally or alternatively, the folding guardrails could retract into an enclosed box or another type of enclosure.

The folding guardrails could include various types, materials, and shapes, such as guardrails with a wing rail or without a wing rail. A wing rail is an extension rail utilized in scenarios where a standard guardrail cannot provide sufficient reach. The guardrails could be formed from machined aluminum members that join at various pivot joints. In such scenarios, the guardrails can foldably raise and retract into a stainless steel frame weldment, which may include a cover lid.

The guardrails could be actuated by one or more electric actuators. When the actuator is extended, it applies a force to one of the aluminum posts of the rail assembly, which causes the rail assembly to pivot and swing upwards, moving from a closed (retracted or stowed) position to an open (unfolded or raised) position. The pinned aluminum rails have cutouts that allow the entire assembly to fold up compactly so it fits flush into the frame weldment in small area.

In the closed position, the rails lie flush into the frame, and the torsion spring loaded hinges rotate the cover door on top of the frame to cover it. When the folding guardrail is installed below the deck surface, and is in the closed position, the cover door creates a flat surface in line with the deck surface. In the open position, the cover door is rotated vertically against the rail creating a toe-guard and preventing foreign objects and/or debris from falling into the frame.

In some embodiments, the guardrail system described herein complies with various federal and state safety guidelines, such as, but not limited to Occupational Safety and Health Administration (OSHA) Regulation 1910.29 (Fall protection systems). Other United States and international safety standards could be addressed by way of the present guardrail system as well.

II. Example Systems

FIG. 1 illustrates a system 100, according to an example implementation. System 100 includes a frame weldment 110. While the term "weldment" is used herein, it will be understood that the frame weldment 110 could additionally or alternatively be formed from machined parts. For example, the frame weldment 110 could be formed from a plurality of parts by welding or other fastening techniques (e.g., bolting, gluing, clamping, etc.). In some embodiments, the frame weldment 110 could be shaped in the form of a hollow rectangular prism (e.g., a cuboid) with at least one open side. It will be understood that the frame weldment 110 could be another shape. The frame weldment 110 could be formed from one or materials such as aluminum, steel, and/or another material.

The system 100 also includes a rail assembly 120. In an example embodiment, the rail assembly 120 includes a first post 130 and a second post 140. A base portion 132 of the first post 130 is rotatably coupled to a first pivot point 112 of the frame weldment 110. A base portion 142 of the second post is rotatably coupled to a second pivot point 114 of the frame weldment 110. The rail assembly 120 also includes a top rail 150 rotatably coupled between a top portion 134 of the first post 130 and a top portion 144 of the second post 140.

The rail assembly 120 could include other posts and/or rails. For example, it will be understood that the rail assembly 120 could include more than two posts. Additionally or alternatively, the rail assembly 120 could include a mid rail 152 rotatably coupled between a middle portion of the first post 130 and a middle portion of the second post 140. Yet further, the rail assembly 120 could include at least one baluster rotatably coupled between the frame weldment 110 and at least one of the top rail 150 or the mid rail 152. As an example, the at least one baluster could provide a vertical barrier between the first post 130 and the second post 140.

In some embodiments, the top rail 150 could extend beyond a span between the first post 130 and the second post 140 to provide a wing rail 154. The wing rail 154 may provide a barrier and/or fall protection for areas located between multiple adjacent rail assemblies and/or outside the span between the first post 130 and the second post 140.

The system 100 additionally includes an actuator 160 configured to controllably adjust a configuration of the rail assembly 120 between an extended configuration and a retracted configuration with respect to the frame weldment 110. In some embodiments, the actuator 160 could include an electric ball-screw linear actuator. In such scenarios, the actuator 160 could include an actuator arm having a throw range between 100 mm to 300 mm. Other throw ranges are possible and contemplated. Additionally, other types of actuators are possible, including, without limitation, pneumatic actuators, rotary actuators, or hydraulic actuators.

In example embodiments, a first end of the actuator 160 could be coupled to an actuator mount of the frame weldment 110. In such scenarios, a second end of the actuator 160 could be coupled to at least one of the first post 130 or the second post 140. It will be understood that other arrangements of the actuator 160 with respect to the first post 130, second post 140, and/or the frame weldment 110 are possible and contemplated so as to controllably adjust the configuration of the rail assembly 120 as described herein.

In some embodiments, system 100 could include a remote unit 170 configured to control a position of the actuator 160. In such scenarios, the remote unit 170 may include a wired remote controller having a user interface 172. As an example, the user interface 172 could include at least one button 174. In some embodiments, a user could press the at least one button 174 to provide a command to extend or retract the rail assembly 120. For instance, the remote unit 170 could include an "EXTEND" button and a "RETRACT" button. User interactions with such buttons could provide corresponding commands to the actuator 160 and/or controller 162 to adjust a position of the rail assembly 120.

In some embodiments, a walking surface could define a reference plane. In such scenarios, the extended configuration could include the first post 130 and the second post 140 extending from the reference plane such that both the first post 130 and the second post 140 are substantially perpendicular to the reference plane. Conversely, the retracted configuration could include the first post 130 and the second post 140 disposed substantially parallel to the reference plane.

In some embodiments, adjusting the configuration of the rail assembly 120 between the extended configuration and the retracted configuration could include foldably raising or retracting the rail assembly 120 with respect to the frame weldment 110. As an example, at least two portions of the rail assembly 120 could be rotatably coupled by way of at least one of: a clevis pin, a rotary bearing, or a rotary bushing. It will be understood that other types of rotatable couplings are contemplated herein. For example, without limitation, the various portions of the rail assembly 120 could be rotatably coupled to one another by way of a plain bearing (e.g., sleeve bearing/bushing), a ball bearing, roller bearing, etc. In such a manner, various portions of the rail assembly 120 (e.g., first post 130 and second post 140) could be configured to rotate with respect to the frame weldment 110. In so doing, the rail assembly 120 could be controllably raised or retracted in a foldable manner.

One or more portions of the rail assembly 120 could include cutouts or other types of accommodating features so that the entire assembly can fold up compactly and fit flush into the frame weldment 110 for use in small areas. However, in some embodiments, the cutouts or other accommodating features need not be present. That is, embodiments that function similarly, but fold less compactly and/or with fewer or no interlocking/intermeshing features, are contemplated and possible within the scope of the present application.

Furthermore, the system 100 could additionally include a cover door 190. The cover door 190 could be rotatably coupled to the frame weldment 110 by way of a hinge (e.g., a piano hinge). In such scenarios, while the rail assembly is moving into the extended configuration, the cover door 190 could be configured to rotate about the hinge and such that it projects out of the reference plane. In such a fashion, the cover door 190 could provide a kick plate, which may prevent foreign objects and debris from falling into the frame weldment 110 and/or off of the walking surface. While the rail assembly 120 is moving into the retracted configuration, the cover door 190 could be configured to rotate about the hinge and into the reference plane, eventually covering the frame weldment 110 and retracted rail assembly 120.

In some embodiments, system 100 could include a controller 162. The controller 162 could include a computer, or another type of microcontroller configured to execute instructions so as to carry out various operations. For example, the controller 162 may include one or more processors and at least one memory. The processor(s) may include, for instance, a microprocessor, an application-specific integrated circuit (ASIC), or a field-programmable gate array (FPGA). Other types of processors, circuits, computers, or electronic devices configured to carry out software instructions are contemplated herein.

The memory may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors of controller 162 may be configured to execute instructions stored in the memory so as to carry out various operations and method steps/blocks described herein. The instructions may be stored in a permanent or transitory manner in the memory.

In some embodiments, the instructions could relate to operations, such as, responsive to receiving information indicative of an extension command, causing the actuator 160 to move the rail assembly 120 into the extended configuration. The operations could also include, responsive to receiving information indicative of a retraction command, causing the actuator 160 to move the rail assembly 120 into the retracted configuration.

In some embodiments, the system 100 could include at least one limit switch 180. In some examples, the at least one limit switch 180 could be is configured to provide information indicative of the rail assembly 120 reaching a position limit. In such scenarios, causing the actuator 160 to move the rail assembly 120 could include moving the rail assembly 120 until receiving the information indicative of the rail assembly reaching the position limit. In other words, the at least one limit switch 180 could indicate that the rail assembly 120 is fully extended or fully retracted. In response to such scenarios, the controller 162 could stop adjusting the actuator 160, thereby stopping movement of the rail assembly 120.

The at least one limit switch 180 could include a switch, button, or another type of sensor. The at least one limit switch 180 could operate based on mechanical, opto-mechanical, magnetic, or optical sensing modalities. However, other types of limit switches or contact/proximity sensors are possible and contemplated.

It will be understood that the controller 162 could be configured to carry out operations involving multiple actuators and corresponding rail assemblies. For example, in some embodiments, system 100 could include a further rail assembly and a further actuator. In such scenarios, the further rail assembly and the further actuator are coupled to the frame weldment 110. The further actuator could be configured to controllably adjust a configuration of the further rail assembly between an extended configuration and a retracted configuration with respect to the frame weldment 110.

Figure 2:
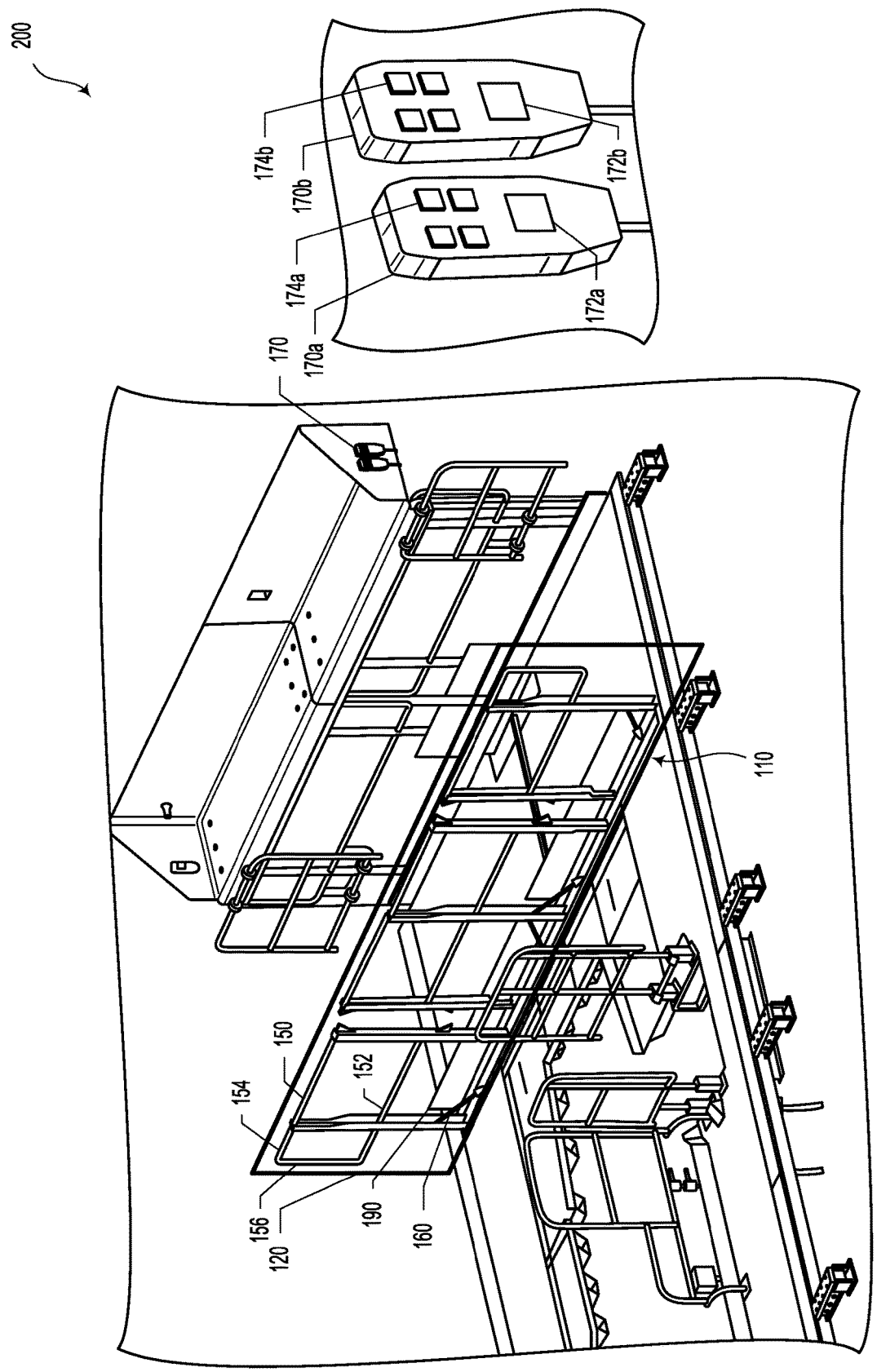
FIG. 2 illustrates a system, according to an example implementation.

FIG. 2 illustrates a system 200, according to an example implementation. It will be understood that system 200 could be similar or identical to system 100 as illustrated and described in relation to FIG. 1. System 200 illustrates a rail assembly 120 that includes several folding guardrails. For clarity, only a subset of the total structures of the rail assembly 120 are specifically numbered in FIG. 2. Other Figures will provide further details about the rail assembly 120.

Rail assembly 120 could be coupled to frame weldment 110 by way of a plurality of posts and an actuator 160. The rail assembly 120 could include a top rail 150, a wing rail 154, and a mid rail 152. In some embodiments, the wing rail 154 and the mid rail 152 could be coupled by way of a vertical end rail 156.

As described elsewhere herein, a cover door 190 could be coupled to the frame weldment 110. While the rail assembly 120 is in an extended configuration, as shown in FIG. 2, the cover door 190 could rotate to a substantially vertical orientation so as to provide a kick plate, which could prevent foreign debris from entering the frame weldment 110 or otherwise falling off of the deck platform.

As illustrated in FIG. 2, system 200 could include a plurality of remote units 170. In some embodiments, system 200 could include a first remote unit 170a and a second remote unit 170b. In such scenarios, the first remote unit 170a could include a plurality of buttons 174a and a user interface 172a. Furthermore, the second remote unit 170b could include a plurality of buttons 174b and a user interface 172b. In examples, the first remote unit 170a could be operable to control a first rail assembly and the second remote unit 170b could be operable to control a second rail assembly. In other embodiments, the respective remote units could control different types of movable and/or foldable guardrails.

While FIG. 2 illustrates one possible location for the remote units 170, it will be understood that other locations are possible and contemplated. For example, the remote units 170 could be located closer to the cover door 190 in the form of a footswitch or pedal. Alternatively, the remote units 170 could be located at a control room or on a centralized control panel. In some embodiments, the remote units 170 could be realized in the form of a mobile computing device, such as a tablet device, a smartphone, or a laptop computer.

Figure 3:
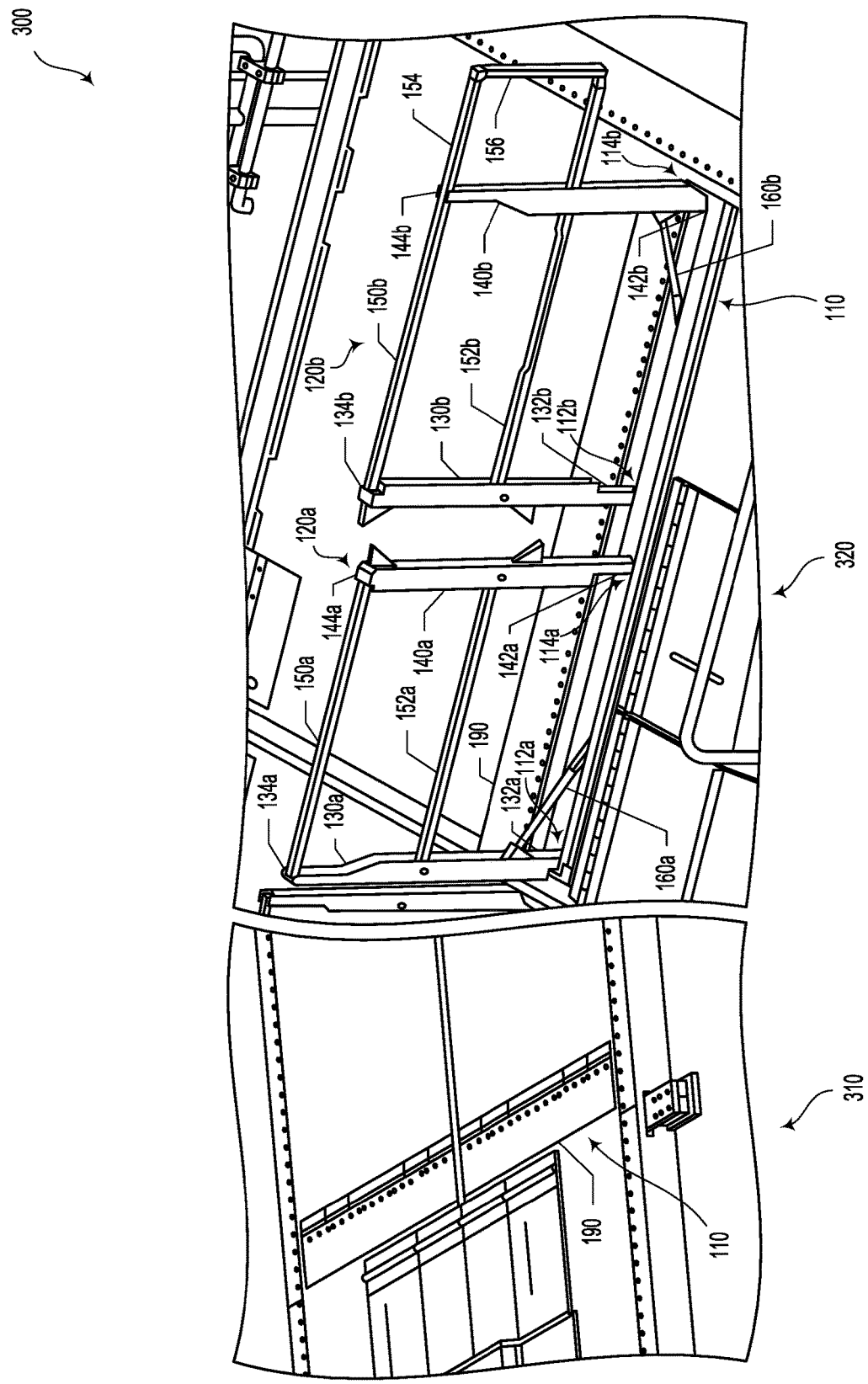
FIG. 3 illustrates a system, according to an example implementation.

FIG. 3 illustrates a system 300, according to an example implementation. System 300 could be similar or identical to systems 100 and 200, as illustrated and described in reference to FIGS. 1 and 2. FIG. 3 includes two views—a CLOSED POSITION 310 and an OPEN POSITION 320. The CLOSED POSITION 310 illustrates a cover door 190, which covers a frame weldment 110. The cover door 190 is illustrated as being closed and in a substantially horizontal or coplanar orientation with respect to a platform surface. As described herein, the CLOSED POSITION could include a completely retracted or stowed configuration of the rail assemblies 120a and 120b.

The OPEN POSITION 320 illustrates two rail assemblies 120a and 120b. Rail assembly 120a includes a first post 130a and a second post 140a. In examples, a base portion 132a of the first post 130a is rotatably coupled to a first pivot point 112a of the frame weldment 110. In some embodiments, a base portion 142a of the second post 140a is rotatably coupled to a second pivot point 114a of the frame weldment 110. Rail assembly 120a also includes a top rail 150a that is coupled to a top portion 134a of the first post 130a and a top portion 144a of the second post 140a. Yet further, rail assembly 120a includes a mid rail 152a that is coupled to respective mid portions of the first post 130a and the second post 140a. As illustrated, a first end of an actuator 160a could be coupled to the first post 130a and a second end of the actuator 160a could be coupled to the frame weldment 110.

Similarly, rail assembly 120b includes a first post 130b and a second post 140b. In examples, a base portion 132b of the first post 130b is rotatably coupled to a first pivot point 112b of the frame weldment 110. In some embodiments, a base portion 142b of the second post 140b is rotatably coupled to a second pivot point 114b of the frame weldment 110. Rail assembly 120b also includes a top rail 150b that is coupled to a top portion 134b of the first post 130b and a top portion 144b of the second post 140b. Yet further, rail assembly 120b includes a mid rail 152b that is coupled to respective mid portions of the first post 130b and the second post 140b. As illustrated, a first end of an actuator 160b could be coupled the second post 140b and a second end of the actuator 160b could be coupled to the frame weldment 110.

As described herein, the OPEN POSITION illustrated in FIG. 3 could include a completely extended or raised configuration of the rail assemblies 120a and 120b.

Figure 4:
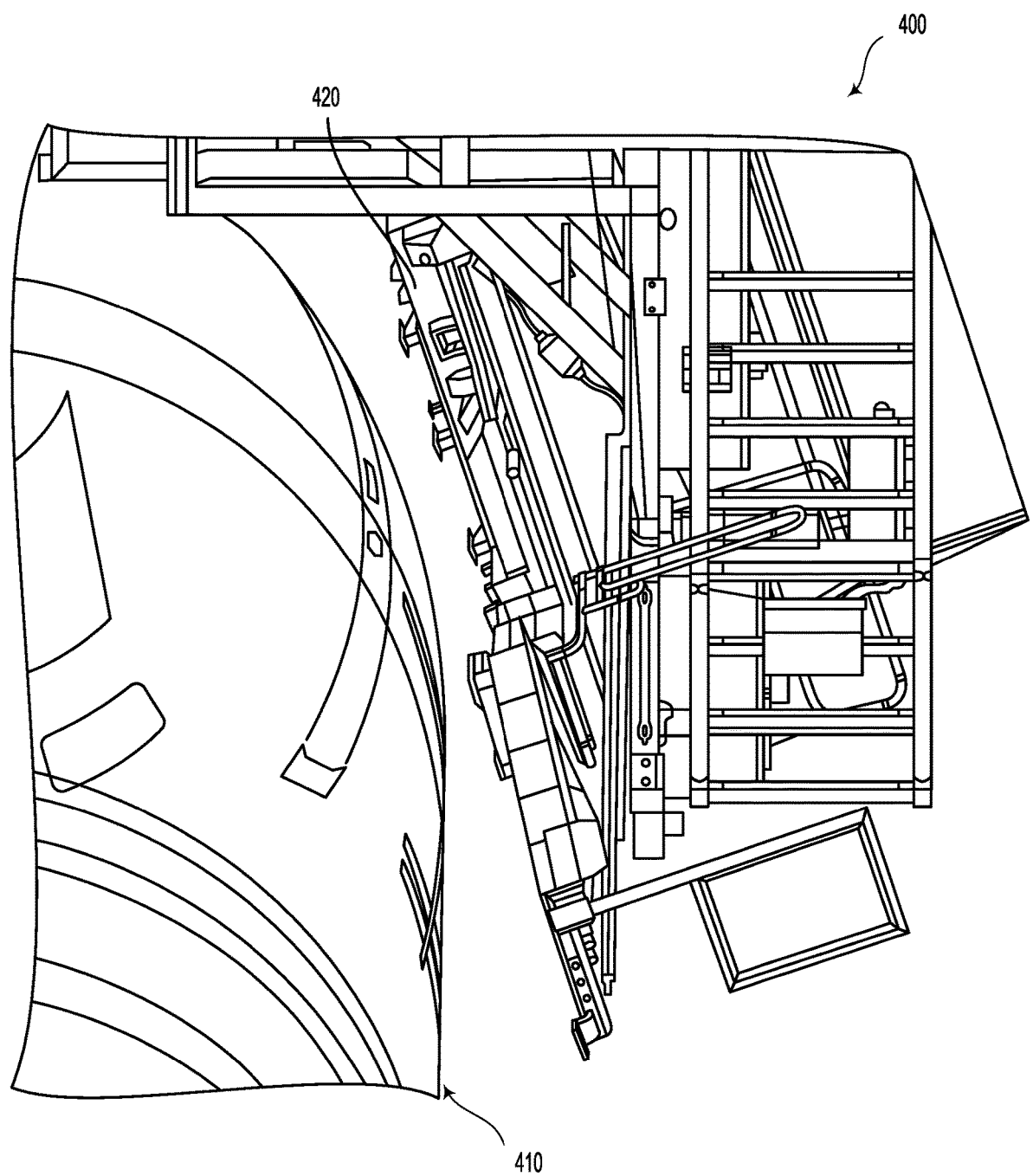
FIG. 4 illustrates a movable deck platform, according to an example implementation.

FIG. 4 illustrates a movable deck platform 400, according to an example implementation. The movable deck platform 400 could include a platform 420 that is operable to rotate or fold so as to provide clearance for an aircraft 410 to move along an assembly line. Other types of movable deck platforms are possible and contemplated herein. In some embodiments, systems 100, 200, and/or 300 could be incorporated in to the movable deck platform 400. For example, the rail assemblies (e.g., rail assembly 120) described herein could be foldably retracted prior to rotating the movable deck platform 400 up and away from the aircraft 410.

After "pulsing" the aircraft assembly line, the movable deck platform 400 could rotate to a substantially horizontal position to provide a walking surface/working platform for personnel. Once rotated into a substantially horizontal position, the foldable guardrails described herein could be adjusted to their extended configuration, protecting personnel who may work on the movable deck platform 400.

Figure 5A:
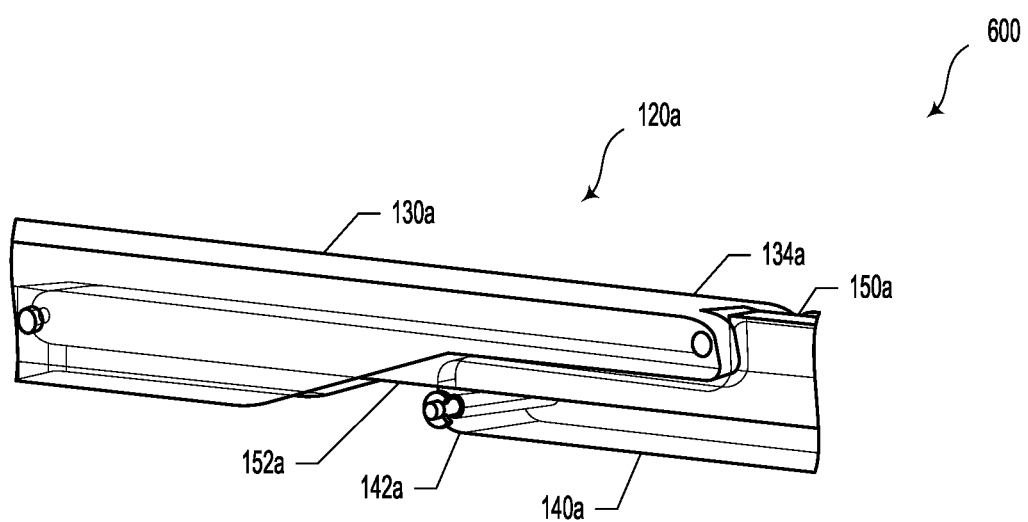
FIG. 5A illustrates an operating scenario, according to an example implementation.

FIG. 5A illustrates an operating scenario 600, which includes a portion of a rail assembly 120a shown as being in a retracted configuration, according to an example implementation. As illustrated, scenario 600 includes a first post 130a and a second post 140a as being substantially coplanar and/or horizontal. That is, first post 130a and second post 140a are both rotated down so that they are not significantly projecting from a walking surface as described herein.

As illustrated, the top rail 150a, which is connected to the top portion 134a of the first post 130a, is substantially parallel to the first post 130a. Furthermore, the top rail 150a is at least partially enclosed by the second post 140a. That is, the top rail 150a is retracted at least partially within the second post 140a. Yet further, the mid rail 152a is illustrated as being at least partially enclosed by both the first post 130a and the second post 140a. In other words, as illustrated in FIG. 5A, the top rail 150a and the mid rail 152a are folded so as to retract compactly within the first post 130a and the second post 140a.

Figure 5B:
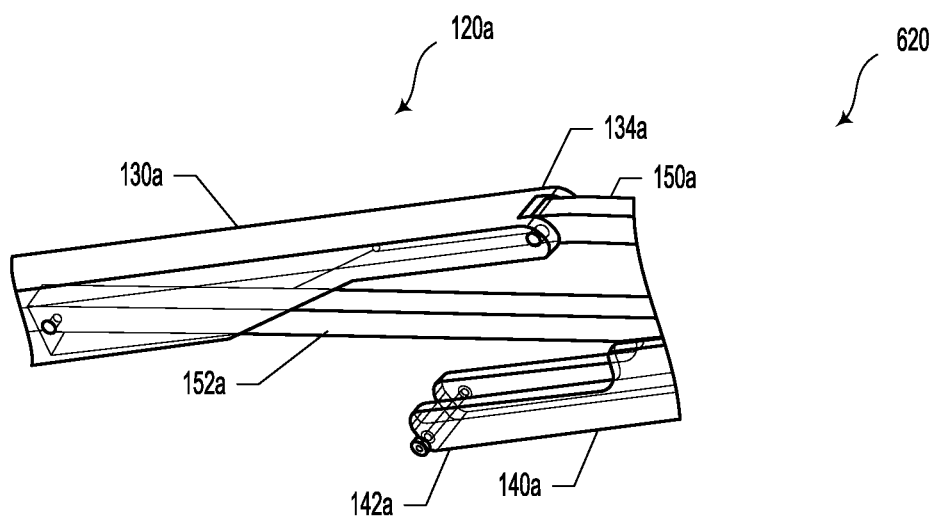
FIG. 5B illustrates an operating scenario, according to an example implementation.

FIG. 5B illustrates an operating scenario 620, which includes a rail assembly 120a shown as being in a partially-extended configuration, according to an example implementation. As illustrated in FIG. 5B, the first post 130a and the second post 140a have been extended partially out of their coplanar and/or horizontal position. Accordingly, mid rail 152a and top rail 150a have rotatably adjusted so as to continue to span between the first post 130a and the second post 140a. In other words, the first post 130a and the second post 140a have rotated out of the plane and are projecting out from the plane in the partially-extended configuration.

Figure 6:
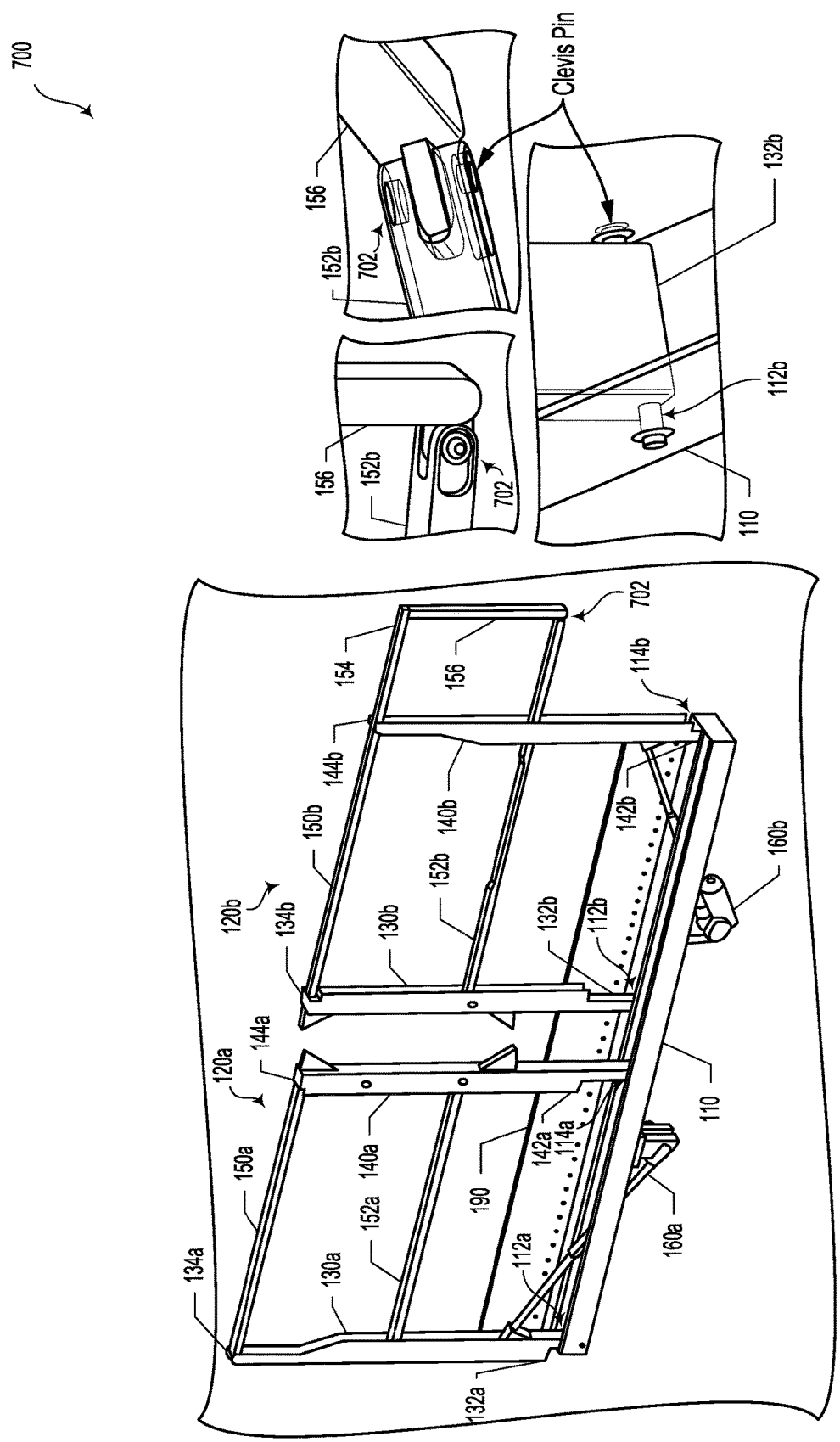
FIG. 6 illustrates a system, according to an example implementation.

FIG. 6 illustrates a system 700, according to an example implementation. System 700 could be similar or identical to systems 100, 200, and 300, as illustrated and described in reference to FIGS. 1, 2, and 3. FIG. 6 includes insets that indicate rail portions that are rotatably joined using clevis pins. For example, the vertical end rail 156 is coupled to the mid rail 152b by way of clevis pin 702.

Figure 7:
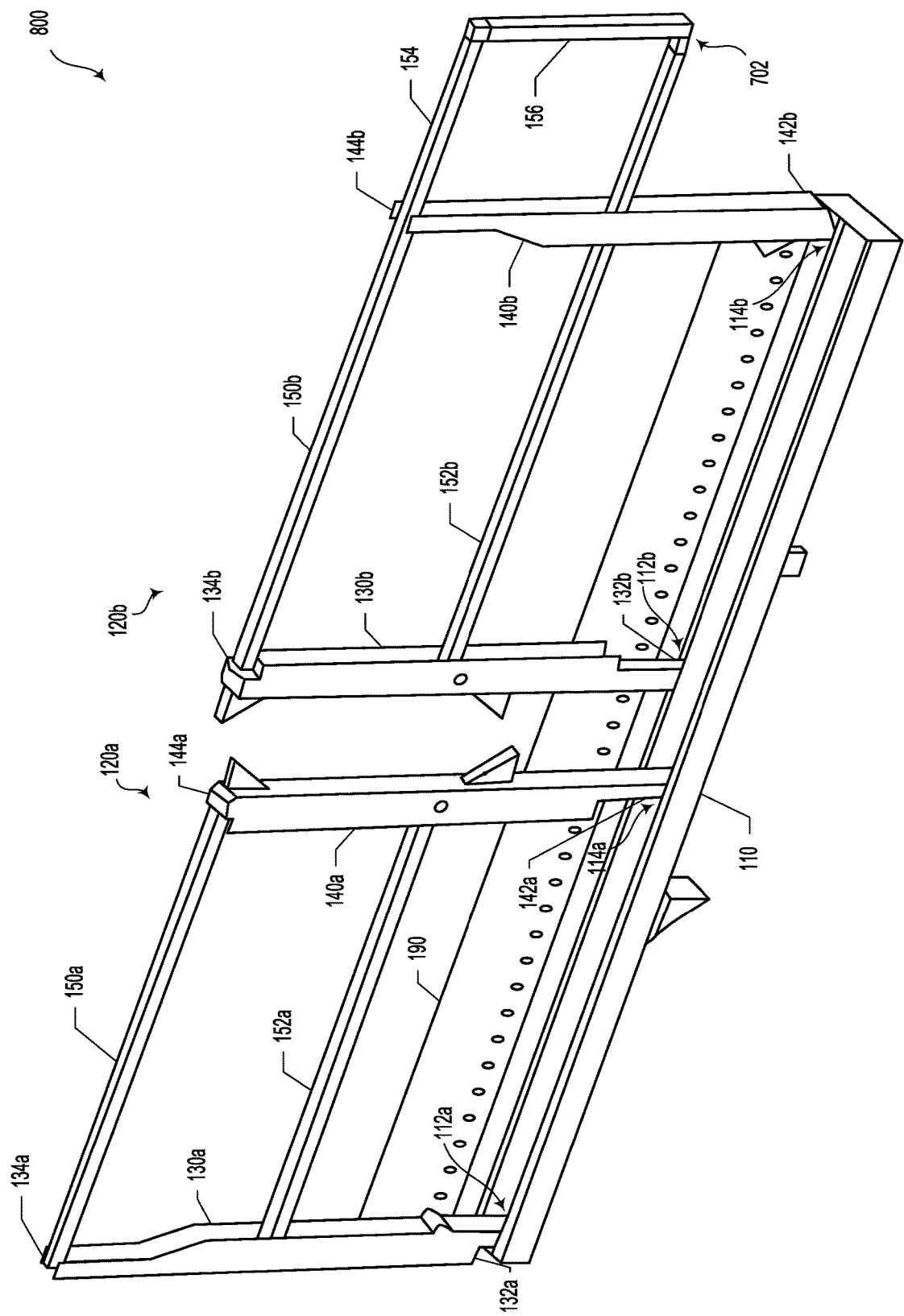
FIG. 7 illustrates a system in an extended configuration, according to an example implementation.

FIG. 7 illustrates a system in an extended, or open, configuration 800, according to an example implementation. As described herein, the extended configuration 800 could include two rail assemblies 120a and 120b. Cover door 190 could be in a raised position, providing a kick plate.

Figure 8:
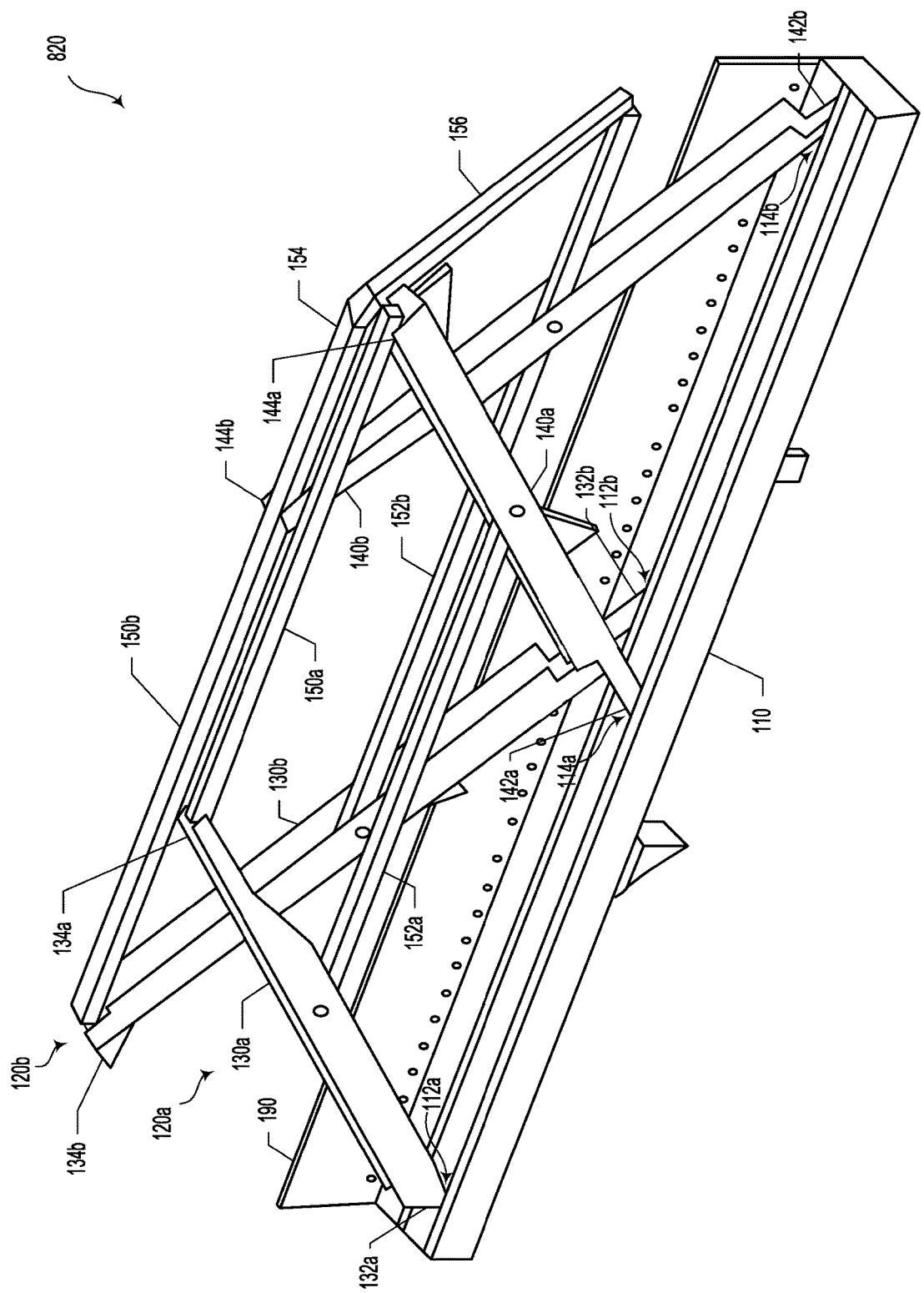
FIG. 8 illustrates a system in a partially-extended configuration, according to an example implementation.

FIG. 8 illustrates a system in a partially-extended configuration 820, according to an example implementation. Namely, FIG. 8 illustrates a 45 degree position of the rail assemblies 120a and 120b. Partially-extended configuration 820 illustrates an intermediate position between a fully-retracted configuration (e.g., retracted configuration 840) and a fully-extended configuration (e.g., extended configuration 800).

Figure 9:
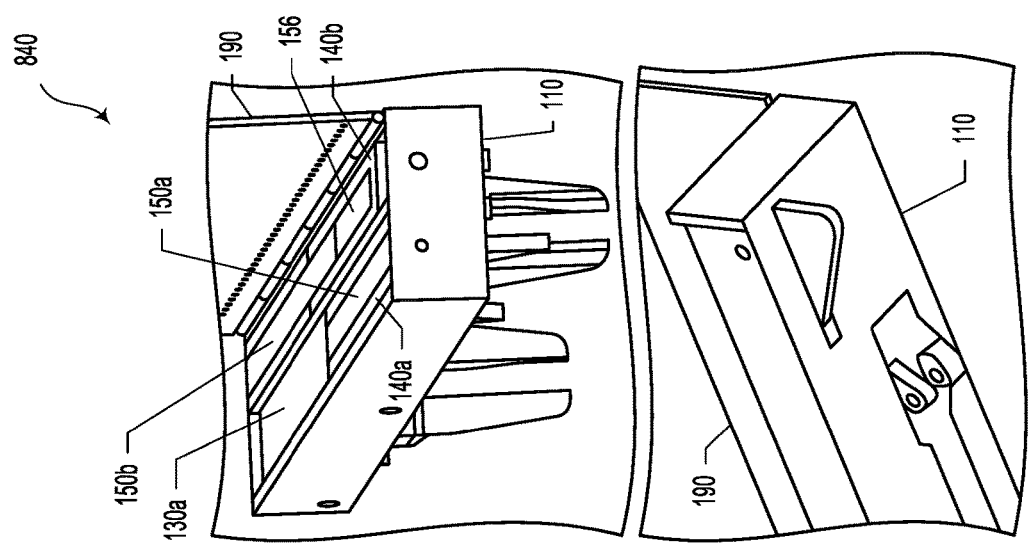
FIG. 9 illustrates a system in a retracted configuration, according to an example implementation.
Figure 9:
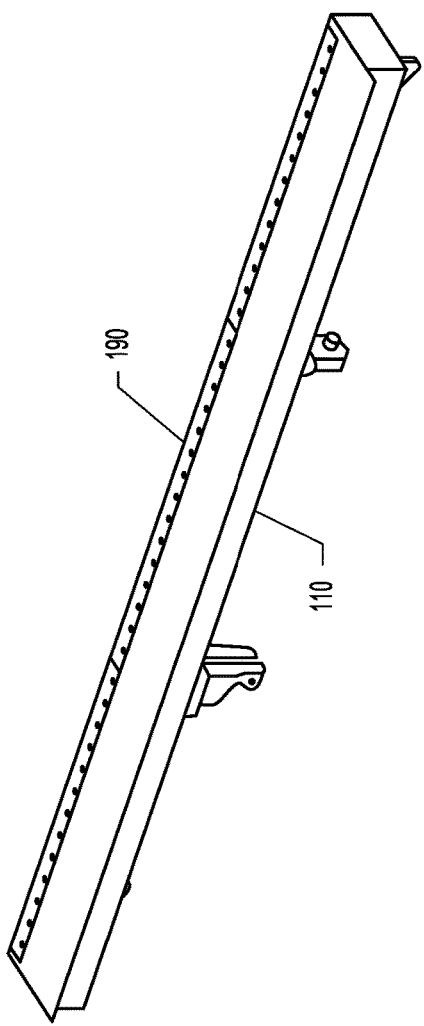

FIG. 9 illustrates a system in a retracted configuration 840, according to an example implementation. As illustrated in FIG. 9, in the retracted configuration 840, the frame weldment 110 is covered by cover door 190. In the two insets, the cover door 190 is rotated into an open position to reveal the retracted rail assemblies 120a and 120b.

III. Example Methods

Figure 10:
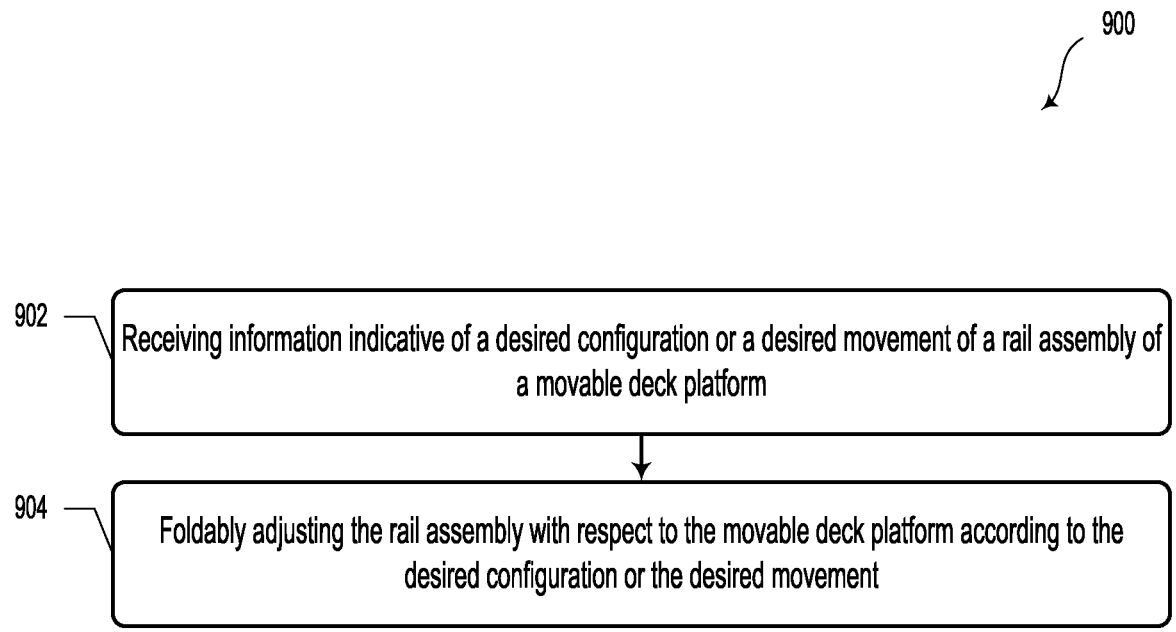
FIG. 10 illustrates a method, according to an example implementation.

FIG. 10 illustrates a method 900, according to an example implementation. Method 900 may involve elements of systems 100, 200, 300, or 700 as illustrated and described in reference to FIGS. 1, 2, 3, and 6. Additionally or alternatively, some or all elements of method 900 may relate to elements of FIGS. 4, 5A, 5B, 7, 8, and 9. While FIG. 10 illustrates certain blocks or steps as following a specific order, it will be understood that some blocks or steps could be omitted and/or other blocks or steps could be included. Furthermore, the blocks or steps could be carried out in a different order, in parallel (e.g., concurrently), and/or repeated.

Block 902 includes receiving information indicative of a desired configuration or a desired movement of a rail assembly of a movable deck platform. For example, some embodiments could include receiving, from a remote unit (e.g., remote unit 170 as illustrated and described in reference to FIG. 1), information indicative of a desired configuration or a desired movement of a rail assembly of a movable deck platform, as illustrated and described elsewhere herein. The information about the desired configuration or the desired movement could include a signal from a user interaction, which could include a user pushing a button, touching a touchscreen, moving a switch, a voice command, etc. For example, the remote unit could include two buttons—a first button to extend the rail assembly and a second button to retract the rail assembly. In response to a user pushing the button to extend the rail assembly, the remote unit may transmit the desired movement (extend the rail assembly) to an actuator controller or another type of control system. Similarly, in response to a user pushing the button to retract the rail assembly, the remote unit may transmit the desired movement (retract the rail assembly) to an actuator controller or another type of control system. In some examples, the signal to retract or extend the rail system may be transmitted while the user is pushing the corresponding button on the remote unit. For instance, a user may be able to control an amount of rail system extension by releasing a button once the rail system has reached a desired configuration (e.g., top rail height, etc.).

In other examples, the received information could include a desired configuration (e.g., fully retracted rail assembly or fully extended rail assembly). In such scenarios, a user need only push the corresponding button (or touchscreen icon) once to provide a signal relating to the desired configuration.

The information about the desired configuration or the desired movement could also include a signal from a computing system. For example, the signal could include an automated retraction command or an automated extension command. Additionally or alternatively, the information about the desired configuration or the desired movement could be provided according to a predetermined schedule and/or based on a planned movement of an aircraft, personnel shift change, among other possibilities.

Block 904 includes foldably adjusting the rail assembly (e.g., rail system 120 as illustrated and described in reference to FIG. 1) with respect to the movable deck platform according to information about the desired configuration or the desired movement, which could be provided by the remote unit. In such scenarios, the movable deck platform includes a walking surface. A frame weldment is coupled at or below the walking surface. A base portion of a first post of the rail assembly is rotatably coupled to a first pivot point of the frame weldment. A base portion of a second post of the rail assembly is rotatably coupled to a second pivot point of the frame weldment. A top rail of the rail assembly is rotatably coupled between a top portion of the first post and a top portion of the second post.

In some embodiments, method 900 could additionally include determining, based on the received information, that the desired configuration includes at least one of an extended configuration or a retracted configuration with respect to the walking surface.

In such scenarios, method 900 may also include, responsive to determining that the desired configuration includes the extended configuration, causing an actuator (e.g., actuator 160 as illustrated and described with reference to FIG. 1) to move the rail assembly into the extended configuration. Furthermore, method 900 could include, responsive to determining that the desired configuration includes the retracted configuration, causing the actuator to move the rail assembly into the retracted configuration.

In some embodiments, method 900 could include receiving, from at least one limit switch, information indicative of the rail assembly reaching a position limit. In such scenarios, method 900 could include, responsive to receiving the information indicative of the rail assembly reaching a position limit, causing the actuator to stop moving the rail assembly. In some embodiments, the limit switch could include a pressure sensor attached to at least one of the rail assembly, the frame weldment, the actuator, and/or a cover door (e.g., cover door 190 as illustrated and described with reference to FIG. 1).

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
    receiving information indicative of a desired configuration of a rail assembly;
    determining, based on the received information, that the desired configuration comprises at least one of an extended configuration or a retracted configuration of the rail assembly with respect to a walking surface, wherein the walking surface defines a reference plane;
    responsive to determining that the desired configuration comprises the extended configuration, causing an actuator to foldably adjust the rail assembly into the extended configuration with respect to the reference plane, wherein causing the actuator to foldably adjust the rail assembly into the extended configuration comprises causing a cover door to rotate about a hinge and out of the reference plane such that the cover door provides a kick plate; and
    responsive to determining that the desired configuration comprises the retracted configuration, causing the actuator to foldably adjust the rail assembly into the retracted configuration with respect to the reference plane, wherein causing the actuator to foldably adjust the rail assembly into the retracted configuration comprises causing the cover door to rotate about the hinge and into the reference plane such that the cover door covers the retracted rail assembly.

2. The method of claim 1, wherein causing the actuator to foldably adjust the rail assembly comprises:
    rotating a first post with respect to a frame weldment, wherein a base portion of the first post is rotatably coupled to a first pivot point of the frame weldment;
    rotating a second post with respect to the frame weldment, wherein a base portion of the second post is rotatably coupled to a second pivot point of the frame weldment; and
    rotating a top rail with respect to the first post and the second post, wherein the top rail is rotatably coupled between a top portion of the first post and a top portion of the second post.

3. The method of claim 2, wherein causing the actuator to foldably adjust the rail assembly into the extended configuration comprises rotating the first post and the second post so as to extend from the reference plane such that both the first post and the second post are substantially perpendicular to the reference plane, and wherein causing the actuator to foldably adjust the rail assembly into the retracted configuration comprises rotating the first post and the second post such that both the first post and the second post are disposed substantially parallel to the reference plane.

4. The method of claim 2, wherein causing the actuator to foldably adjust the rail assembly comprises rotating at least two portions of the rail assembly that are rotatably coupled by way of a clevis pin.

5. The method of claim 2, wherein causing the actuator to foldably adjust the rail assembly comprises rotating at least two portions of the rail assembly that are rotatably coupled by way of at least one of: a rotary bearing or a rotary bushing.

6. The method of claim 2, wherein causing the actuator to foldably adjust the rail assembly comprises extending or retracting an electric ball-screw linear actuator within a throw range between 100 mm to 300 mm.

7. The method of claim 1, wherein receiving the information indicative of the desired configuration or a desired movement of the rail assembly comprises receiving the information from a remote unit configured to control a position of the actuator.

8. The method of claim 7, wherein receiving the information from the remote unit comprises receiving the information at a user interface by way of a wired or wireless communication link.

9. The method of claim 8, wherein receiving the information at the user interface comprises receiving at least a portion of the information by way of at least one button or a touchscreen.

10. The method of claim 8, wherein receiving the information at the user interface comprises receiving voice commands from a user.

11. The method of claim 1, further comprising:
    receiving, from at least one limit switch, information indicative of the rail assembly reaching a position limit; and
    responsive to receiving the information indicative of the rail assembly reaching a position limit, causing the actuator to stop moving the rail assembly.

12. The method of claim 11, wherein reaching the position limit comprises opening or closing the at least one limit switch.

13. The method of claim 1, wherein at least some methods steps are carried out according to at least one of: a predetermined schedule, a planned movement of an aircraft, or a personnel shift change.

14. The method of claim 1, wherein causing an actuator to foldably adjust the rail assembly with respect to the reference plane comprises foldably adjusting the rail assembly with respect to a deck surface of a movable deck platform.

15. The method of claim 14, wherein causing the actuator to foldably adjust the rail assembly into the retracted configuration with respect to the reference plane comprises foldably retracting the rail assembly into an enclosed box at or below the deck surface of the movable deck platform.

16. The method of claim 14, further comprising: rotating or folding the movable deck platform so as to provide clearance for an aircraft to move along an assembly line.

17. The method of claim 16, wherein causing the actuator to foldably adjust the rail assembly into the retracted configuration is performed prior to rotating or folding the movable deck platform.

18. The method of claim 16, wherein causing the actuator to foldably adjust the rail assembly into the extended configuration is performed subsequent to rotating or folding the movable deck platform.

19. The method of claim 1, wherein the actuator is a pneumatic actuator, rotary actuator, or hydraulic actuator.

20. The method of claim 1, wherein receiving information indicative of the desired configuration of the rail assembly comprises:
    receiving the information from a mobile computing device or centralized control panel.

* * * * *